United States Patent Office 2,709,926
Patented June 7, 1955

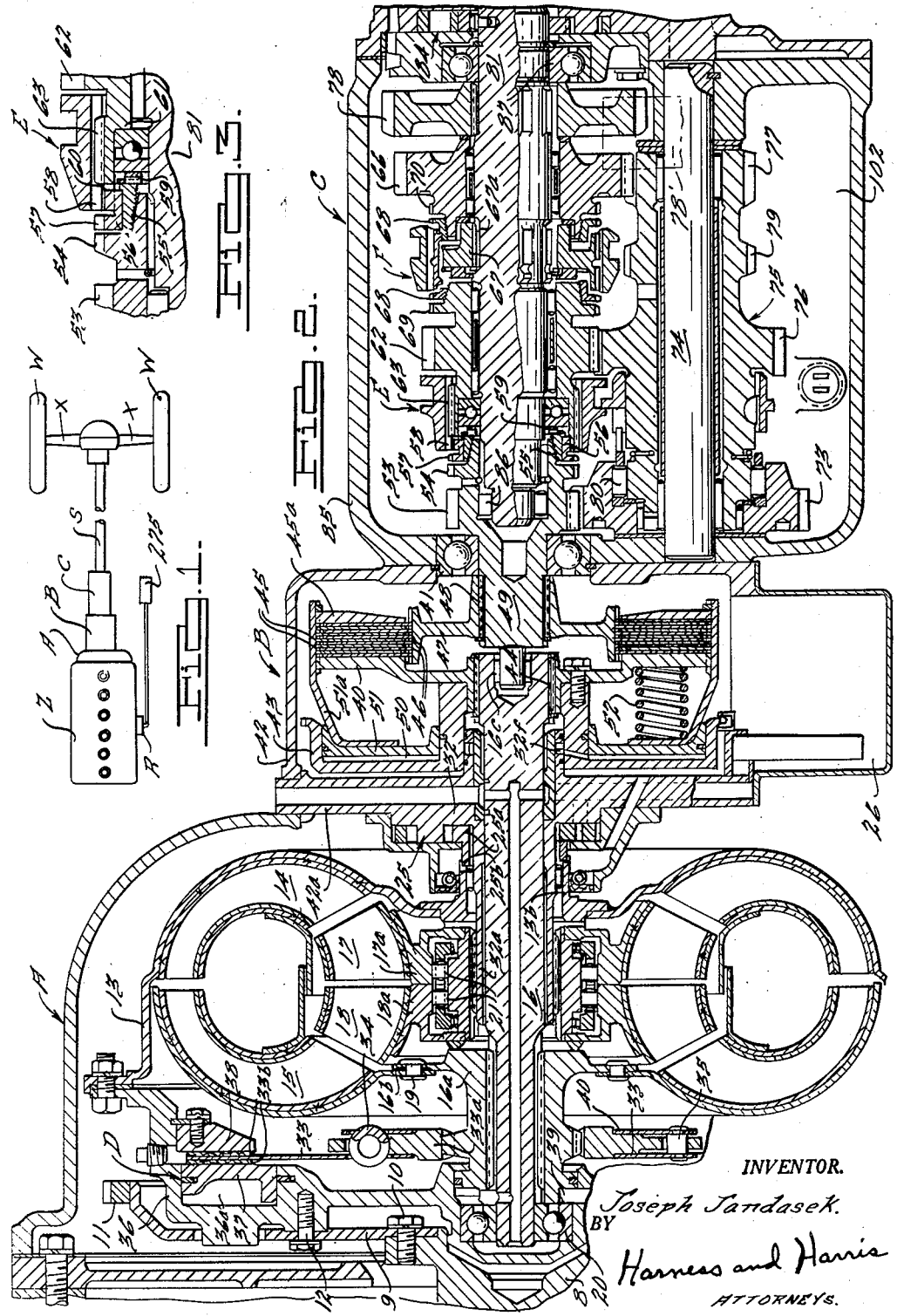

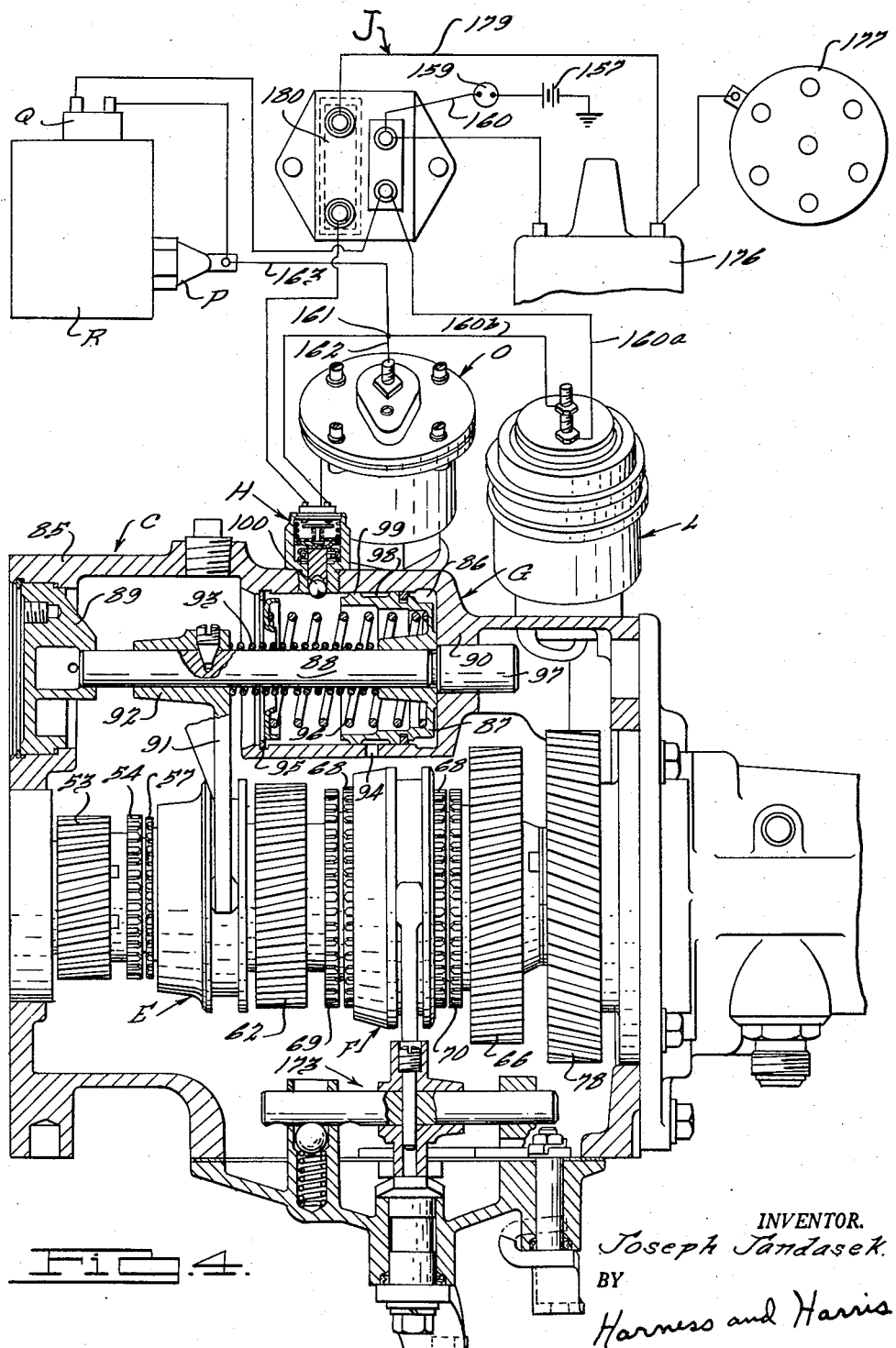

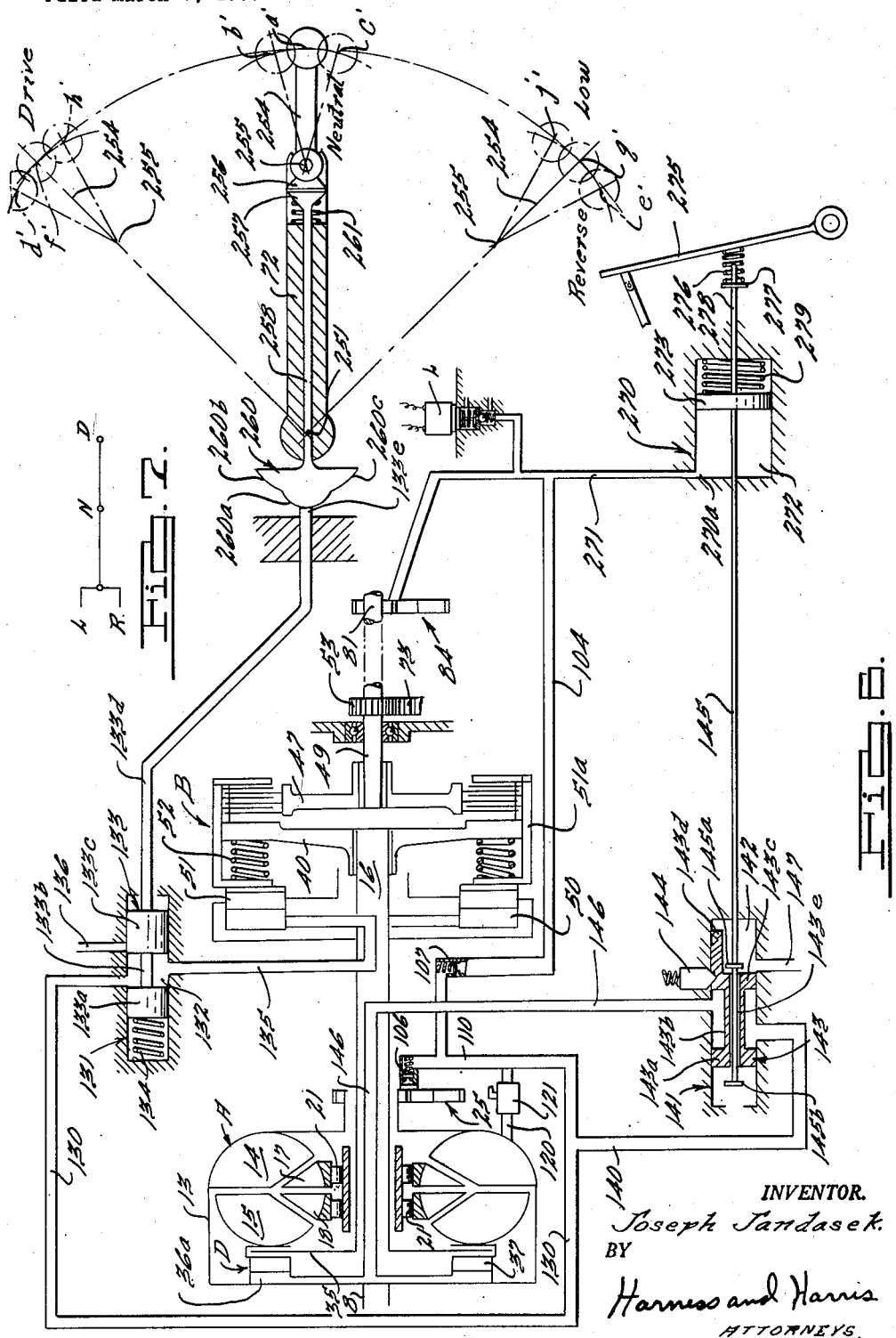

2,709,926

HYDRODYNAMIC TRANSMISSION

Joseph Jandasek, Highland Park, Mich., assignor to Chrysler Corporation, Highland Park, Mich., a corporation of Delaware Application March 7, 1950, Serial No. 148,125

24 Claims. (Cl. 74—645)

This invention relates to a power transmission unit comprising an infinitely variable hydrokinetic torque converter, a pressure fluid operated master clutch, and a semi-automatic type of change speed gear box, which elements are arranged in a series drive transmitting relationship and provided with novel control means to insure the maximum flexibility and ease of operation for a unit of this general type.

It is a primary object of this invention to provide a power transmission unit including a series arranged torque converter and change speed gear box with hydraulically operated control means therefor that are so interrelated that operation of the power transmission unit is considerably simplified and the flexibility of operation of the power transmission unit greatly improved.

It is another object of this invention to provide a change speed power transmission unit having a gear selector lever that includes a clutch operating device that is automatically actuated by operation of the gear selector lever.

It is another object of this invention to provide a power transmission unit that includes a hydrokinetic torque converter and a semi-automatic type of change speed gear box wherein the torque converter includes a lock-up clutch that is controlled by means that also control the shifts within the gear box.

Other objects and advantages of this invention will become readily apparent from a reading of the attached specification and a consideration of the related drawings wherein:

Fig. 1 is a schematic diagram of a motor vehicle drive train embodying this invention;

Fig. 2 is a sectional elevational view of the power transmission unit embodying this invention;

Fig. 3 is an enlarged fragmentary sectional elevational view of the shift sleeve arrangement employed in the change speed gear box of this transmission unit;

Fig. 4 is a sectional elevational view of the gear box of this transmission unit with certain of the controls therefor shown diagrammatically;

Fig. 6 is a diagrammatic sketch of the control system for the torque converter and master clutch associated with this power transmission unit; and Fig. 7 is a diagrammatic sketch of the shift pattern for this power transmission unit gear selector lever.

Figure 5:
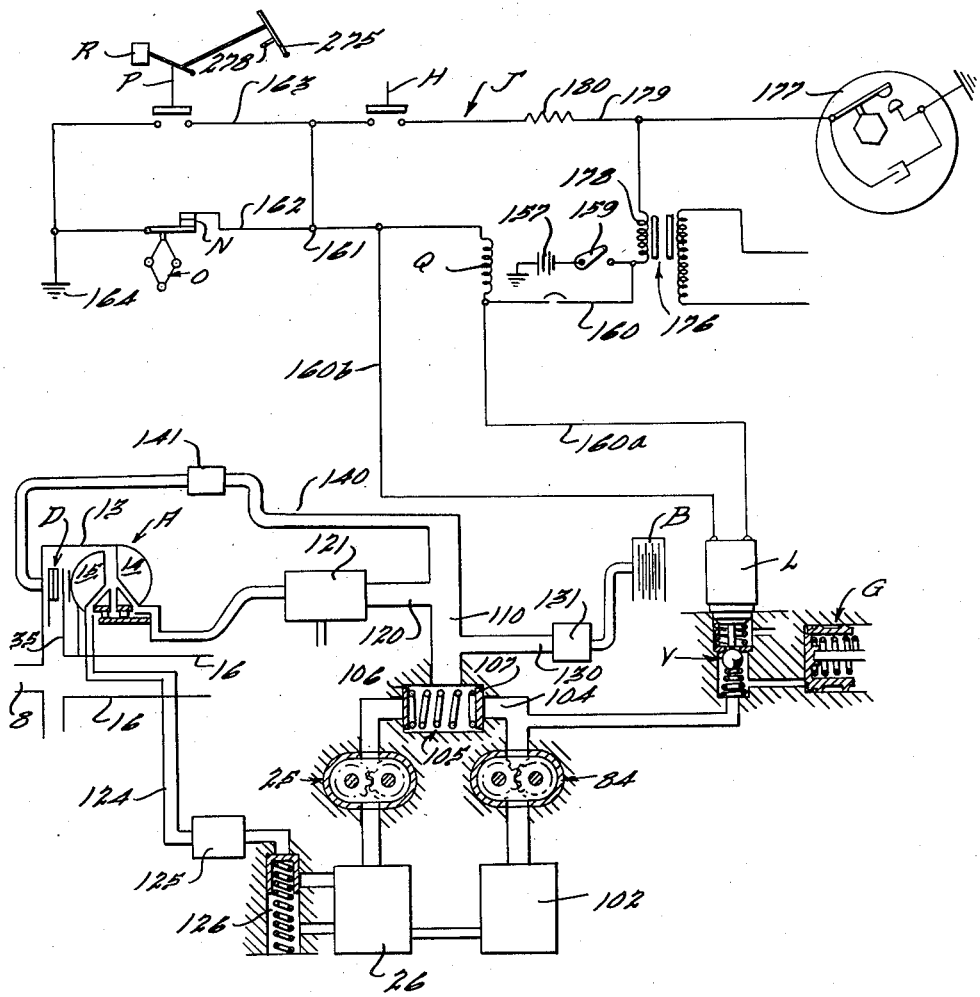
Fig. 5 is a diagrammatic sketch of the control system for the complete power transmission unit.

Fig. 1 diagrammatically discloses a conventional motor vehicle power plant and drive train comprising an internal combustion type of engine Z drivingly connected to a power transmission unit that consists of the hydrokinetic type of torque converter unit A, the multiple disc, friction type master clutch unit B and the change speed gear box C. The output from gear box C drives a propeller shaft or drive shaft S that transmits drive to the rear wheels W of the vehicle through the rear driving axles X.

Fig. 2 of the drawings discloses that the hydrokinetic torque converter unit A, the master clutch unit B, and the change speed gear box C are arranged in a series drive transmitting relationship. The reference numeral 8 represents an end portion of a driving member, such as the crankshaft of the engine Z of the motor vehicle power unit. The shaft 8 is drivingly connected to the axially flexible drive transmitting plate 9 by the screw means 10. The drive transmitting plate 9 has an engine starter ring gear 11 fixedly mounted about its periphery. Also drivingly connected to the drive plate 9, by the screw means 12, is the torque converter casing 13 within which are mounted the various converter components, namely, the impeller member 14, the turbine or runner member 15, and the primary and secondary guide wheels or reaction members 17 and 18 respectively.

The vaned impeller wheel 14 is fixedly connected to the converter casing 13 by welds or the like and is accordingly adapted to be rotatably driven by the driving shaft 8. The vaned turbine wheel 15 is drivingly connected by rivet means 19 to a radially extending flange portion 16b formed on the shaft hub member 16a that is drivingly connected to the forward end portion of the intermediate driven shaft member 16.

The intermediate shaft member 16 is adapted to transmit drive from the turbine member 15 of the torque converter unit A through clutch B to the gear unit C which gear unit is arranged in series with the torque converter unit A. The forward end of intermediate shaft 16 is journaled in the bearing 20 that is associated with the torque converter lock-up clutch D. The rear end portion of intermediate shaft 16 is rotatably supported by fixed sleeve unit 32 carried by the housing 42 of the clutch unit B.

The vaned guide wheels 17 and 18 are rotatably mounted within the converter casing 13 by the guide wheel hub portions 17a and 18a respectively that are rotatably mounted, by means of one-way brake devices 21, on the axially extending sleeve portion 32a of the sleeve unit 32. Sleeve unit 32 is fixed to and projects from the wall 42a of the relatively stationary, housing 42. The one-way brakes 21 are arranged such that they will permit only forward rotary movement (clockwise when looking from the converter A towards the gear unit B) to be transmitted to the guide wheels 17 and 18 by the forward rotation of the impeller 14. The brakes 21 preventing rotation of the guide wheels 17 and 18 in a reverse or counterclockwise direction.

The torque converter unit A includes a gear type oil pump 25 having a driving gear 25a that is directly connected by key means 25b to the axially extending flange portion 13b of the rotatable converter casing 13. The pump 25 draws oil from a sump 26 and circulates it through the converter unit A, the transmission lubricating system and the various hydraulically operated control mechanisms associated with this transmission unit (see Fig. 5). A second pump 84, driven by the transmission output shaft 81 is also included in this transmission to provide a source of pressure fluid for the various hydraulically operated devices associated with the transmission unit when the engine driven pump 25 is not operating.

In order to provide means for transmitting a positive, two-way direct drive from the driving shaft 8 to the intermediate shaft 16 a torque converter lock-up clutch D is provided. The lock-up clutch D includes the radially extending drive transmitting disc 33 which has friction elements 33b mounted on its side faces adjacent its periphery. Drive transmitting disc 33 is drivingly connected by hub portion 33a to the shaft 16 through the shaft hub member 16a. Mounted between the disc 33 and the disc hub member 33a are several circumferentially spaced compression spring elements 34 (only one shown) that cushion the torque impact transmitted to the disc 33 on engagement of the clutch D. Springs 34 thereby facilitate smooth engagement of the clutch D. Pins 35 are arranged to extend between the disc 33 and an anchor plate 40 through enlarged openings in the hub member 33a so as to provide an additional means to connect the disc 33 and hub member 33a in the event of failure of the springs 34. Pins 35 also urge the disc 33 and anchor plate 40 against the sides of the hub member 33a and thereby tend to damp out vibrations of the disc 33. Cooperatively associated with the drive transmitting disc 33 is a driving plate 36 that is assembled as a part of the torque converter casing 13. Plate 36 is formed with an axially extending piston bore 36a adjacent its periphery. Mounted within the piston bore 36a in plate 36 is an axially shiftable, hydraulically actuated, piston 37. Plate 36 also supports a backing plate 38 which is arranged to cooperate with the piston 37 so as to provide means to clampingly engage the friction faces 33b of clutch disc 33 when pressure fluid is admitted to the cylinder 36a. Pressure fluid may be introduced to the cylinder 36a through the bore 39 in the plate 36. Admission of pressure fluid to the piston bore in plate 36 will move the piston 37 rearwardly so as to engage the torque converter lock-up clutch D and directly connect the driving shaft 8 to the intermediate shaft 16. On release of the pressure fluid from the piston bore in plate 36 suitable spring means (not shown) will urge the piston 37 forwardly to disengage the clutch D and provide a means for the transmission of a fluid transmitted, torque multiplying drive from shaft 16. Clutch D is pressure fluid applied and normally maintained disengaged by spring means.

The master clutch B arranged between converter A and gear box C includes the drum-like annular member 43 which is splined at 44 to the intermediate driven shaft 16. Annular member 43 is formed with a piston bore 50 to receive the clutch actuating piston 51. Piston 51 mounts an extension 51a that drivingly supports the friction clutch elements 45 and the clutch pressure plate 45a. Also drivingly mounted on the shaft 16 at 44 is the spider element 40 that constitutes the backing plate for clutch B. Clutch elements 45 are adapted to be engaged with cooperating friction clutch elements 46 carried by the spider member 47. Spider member 47 is drivingly connected at 48 to the input shaft 49 of the change speed gear box C. Shaft 16 constitutes the driving member of clutch B whereas shaft 49 constitutes the driven member of clutch B. Engagement of clutch discs 45 and 46 is normally maintained by the compression spring 52 urging the piston 51 forwardly to cause the pressure plate 45a to clampingly engage the clutch discs 45 and 46 between the pressure plate 45a and the backing plate 40. The disengagement of clutch D is effected by the admission of pressure fluid to the piston bore 50 in the annular member 43. Pressure fluid admitted to piston bore 50 moves the reciprocably mounted piston 51 rearwardly to cause disengagement of clutch discs 45 and 46. Passage 32f in sleeve 32 provides a conduit means for supplying pressure fluid to the piston bore 50. The transmission input shaft 49 which transmits drive from clutch B to gear box C has its forward end piloted in the intermediate driven shaft 16 as shown at 16c and its rear portion is supported by the bearing assembly 41 carried by the housing 85 for the gear box C.

The illustrated change speed transmission gear box C is of the underdrive type although other types including overdrive transmissions of known commercial form may be employed if desired. This transmission unit C includes the input shaft 49 which carries the input pinion 53, the clutch teeth 54 and a synchronizer ring friction cone 55. The cone 55 (see Fig. 3 particularly) has rotatably mounted thereon the synchronizing blocker ring 56 which is formed with blocker teeth 57 adapted to be engaged by the teeth 58 of an axially shiftable clutch sleeve E. Sleeve E is adapted to be drivingly connected to the output shaft 81 by means that are subsequently described. This shift sleeve E and input shaft 49 comprise relatively rotatable members each of which is provided with engageable, toothed, drive control elements 58, 54 respectively for effecting step-up and step-down variation in the speed ratio drive to be transmitted by the transmission unit C.

The output shaft 81, which has its forward end portion piloted at 86 in the rear end of input shaft 49 has its rear end portion rotatably supported by the transmission casing mounted bearing assembly 87. The output shaft 81 has rotatably mounted thereon a gear element 62. Also rotatably mounted on the output shaft 81 is a low speed gear 66. A manually operable, axially shiftable, internally toothed, sleeve type clutch F is adapted to drivingly connect either of the gears 62 and 66 to the output shaft 81. The clutch sleeve F has its internal teeth or splines slidably engaged with axially extending splineways or external teeth on the hub member 67. Hub member 67 is drivingly connected to the output shaft 81 by the splined connection 67a. The clutch sleeve F has associated therewith a pair of axially spaced, toothed, blocker synchronizing rings 68 similar to blocker ring 56 associated with sleeve E. The clutch sleeve F may be shifted either forwardly to establish a high range drive ratio or rearwardly to establish a low range driving ratio. The axial shift of sleeve F energizes the blocker rings 68 so as to synchronously clutch the internal teeth or splines on sleeve F either with the high speed gear 62 through the gear teeth 69 or with the low speed gear 66 through the gear teeth 70. Manual shifts of clutch E are facilitated by release of the master clutch B through operation of the gear shift lever 72 which is subsequently described in detail.

Input pinion 53 has constant mesh with a gear 73 that is rotatably supported by the countershaft 74. Countershaft gear 73 is drivingly connected through an overrunning clutch 80 to the countershaft gear cluster 75. Clutch 80 permits gear cluster 75 to overrun gear 73 in a forward direction. The gear cluster 75 comprises gears 76 and 77 respectively which are in constant mesh with gears 62 and 66 respectively. For reverse drive an axially shiftable idler gear 78' is provided. This gear 78' has constant mesh with gear 77 and is adapted to be shifted rearwardly to mesh with the reverse gear 78 that is fixed on output shaft 81. Clutch F is maintained in its illustrated neutral position when reverse drive is to be transmitted from input shaft 49 to output shaft 81.

Blocker ring 56 (see Fig. 3) is lightly urged against the cone 55 of input pinion 53 by an annular washer type spring 59 that extends between the forward end 61 of gear 62 and the blocker ring 56. Ring 56 has a lost-motion lug and slot connection at 60 with the circumferentially slotted forward end of the hub 61 of the high speed gear 62 such that the blocker ring 56 may rotatably move relative to sleeve E between two positions blocking the forward shift of sleeve E. Such positions are known as the drive block and the coast block positions of the ring 56 depending on whether pinion 53 appreciably leads or lags the speed of the sleeve E. The sleeve E is splined on the gear hub 61 as shown at 63. The arrangement of the blocker ring 56 relative to the drive pinion teeth 54 and sleeve teeth 58 is such that whenever sleeve E is rotating faster or slower than pinion 53 then the blocker ring teeth 57 will be aligned with the ends of the teeth 58 of sleeve D and thus prevent forward shift of the sleeve teeth 58 into contact with drive pinion teeth 54. However, when the pinion 53 is rotating faster than sleeve E and gear 62 and the sleeve E is biased forwardly into the so-called drive blocked position, the driver may release the engine accelerator pedal (see Figs. 5 and 6) or apply some other control element so as to cause the driving engine and the drive pinion 53 to slow down. As the speed of the drive pinion 53 and sleeve E pass through a substantially synchronous speed relationship the blocker ring 56 is moved from its drive blocking position toward its coast blocking position and when substantially mid-way therebetween will unblock the sleeve teeth 58 and allow teeth 58 to move forwardly between the blocker teeth 57 and clutch with the drive pinion teeth 54.

When manually shiftable clutch F is shifted rearwardly to clutch gear 66 to shaft 81 then an overrunning relatively slow speed low range forward drive or first speed is transmitted from shaft 49 to shaft 81 by way of gears 53, 73, overrunning clutch 80, and gears 77 and 66. If at such time sleeve E should be biased forwardly into the drive block position and the shaft 49 then allowed to coast down by overrunning release of clutch 80, then when the speed of drive pinion teeth 54 is substantially synchronized with the speed of teeth 58 of sleeve E, the latter teeth, as aforesaid, will be unblocked and will clutch with the drive pinion teeth 54 to effect a direct connection therebetween and a step-up in the transmission drive ratio. After engagement of teeth 54 and 58 a two-way, relatively fast speed, low range drive or second speed is transmitted from shaft 49 through sleeve E to gear 62 thence by way of gears 76, 77, and 66 and engaged clutch F to the output shaft 81, the clutch 80 overrunning during this drive.

If clutch F is shifted forwardly to clutch gear 62 to shaft 81 then an overrunning relatively slow speed high range drive or third speed is transmitted from shaft 49 to shaft 81 by way of gears 53, 73 overrunning clutch 80, gears 76 and 62 thence through engaged clutch F to output shaft 81.

In the same manner as aforesaid in connection with step-up from first to second speed, sleeve E may be clutched to input shaft 49 under coast synchronous speed conditions with pinion shaft 54 engaging sleeve teeth 58 to effect a two-way high range or direct fourth speed drive ratio of 1 to 1 from shaft 49 directly through sleeve E and engaged clutch F to shaft 81, clutch 80 overrunning during this drive.

If clutch F is left in the neutral position and the axially shiftable idler gear 78' is shifted rearwardly to meshingly connect gears 77 and 78, then a reverse drive may be transmitted from shaft 49 through gears 53, 73, clutch 80, gear 77, idler gear 78' and gear 78 to the output shaft 81. Reverse drive is also adapted to be upshifted to a high speed reverse drive by forward shift of clutch sleeve E.

A gear pump 84 drivingly connected to the output shaft 81 is provided to supply pressure fluid to the power transmission unit C. This pump will provide pressure fluid for the transmission C as well as the converter A and clutch B when the engine Z is not operating (see Fig. 5). This arrangement is advantageous during a towed or pushed start.

The control system for the gear box C will now be described. (See Figs. 4 and 5.) Speed responsive governor means O, that may be driven from the countershaft cluster gear 79, is provided as one means to automatically control forward bias of sleeve E as well as rearward bias thereof as will presently be more apparent. Furthermore, during drive in either second or fourth, a downshift or step-down to first or third respectively may be manually effected by rearward bias of sleeve E under control of the driver. This downshift may be accomplished by a full depression of the engine accelerator pedal (see Figs. 5 and 6 note 275), so as to operate a kickdown switch P which is also subsequently described.

Referring now to Fig. 4, I have illustrated servo-motor means in the form of a fluid motor or shift cylinder G for controlling shift of sleeve E, this motor comprising a cylinder 86 slidably receiving a piston 87 which slidably receives a rod 88 that is mounted so as to reciprocate in the housing guideways 89, 90. Fixed to this rod 88 is the collar 92 of a yoke 91 that is connected with sleeve E to effect shift thereof. A relatively small force, pre-loaded, engaging spring 93 is threaded on rod 88 and is disposed between piston 87 and yoke 91 to provide a lost-motion thrust transmitting connection such that piston 87 may move forwardly or to the left relative to rod 88 during its power stroke, movement of piston 87 being limited by relief ports 94 and abutment 95 in advance of the full clutching shift of sleeve E. On movement of piston 87 to the left the engaging spring 93 is compressed and this compressed spring then urges the yoke collar 92 towards the left so that the teeth 58 of sleeve E are moved into engagement with teeth 57 of blocker 56 and, after coast, with teeth 54 of pinion 53. The yoke collar 92 is arranged to abut against the exposed end of guideway 89 when the sleeve E has come to rest in its fully engaged, forward, up-shifted position. A relatively large force, pre-loaded, kickdown spring 96 is disposed between abutment 95 and piston 87 and serves to normally return the piston 87 and sleeve E to the downshifted Fig. 4 position. The spring 96 is thus adapted to effect disengaging bias of sleeve E relative to pinion teeth 54.

Rod 88 has a shoulder 97 which is adapted to engage the head of piston 87 when the piston 87 is in its downshifted position but which, when the piston 87 and rod 88 are moved to the left to the end of their forward, upshifted strokes, is spaced rearwardly of the piston head to provide a gap equal to the difference in the strokes of the piston and rod. This gap is utilized to close an ignition control switch H that is provided for interrupting the engine ignition system J. Ignition interruption on downshift is advantageous for it momentarily relieves the torque between engaged teeth 54, 58 so that the kickdown spring 96 may move the shift sleeve E rearwardly to its downshifted position. Piston 87 is formed with an annular groove 98 in its skirt portion to define the cam portion 99 which operates the ball actuator 100 for closing the contacts of the ignition interruption switch H.

Pressure fluid supply system for operation of the shift cylinder servo-motor G comprises a suitable supply of oil which is usually at the transmission sump 102. The pump 84 which is driven by the transmission output shaft 81, draws the oil from the supply sump 102 for delivery under pressure to the cylinder 86 of servo-motor shift cylinder G. An electrically operated control valve V (see Fig. 5) controls the passage of oil to the shift cylinder G. This valve is operated by the solenoid L. When the valve V is set so as to allow oil to be forced directly from the pump 84 into shift cylinder G, the pressurized oil in cylinder G moves the piston 87 and shift rod 88 to the left thus causing yoke 91 to shift sleeve E to the left and thereby condition the transmission C for the up-shift or step-up to second or fourth speed depending on whether clutch F is engaged with first speed gear 66 on third speed gear 62. When the solenoid L causes the control valve V to shut off the supply of pressurized oil to the shift cylinder G then the piston or kickdown spring 96 tends to drive the rod 88 and shift yoke 91 towards the right to the downshifted position shown in Figs. 2 and 4. The control circuit for energization of the solenoid L is such that the solenoid L is energized only in first and third speeds and consequently in second and fourth speeds, where most of the actual driving time is accumulated, the solenoid L is in a de-energized condition. This arrangement increases the life of the solenoid L and accordingly renders the system more economical than one where the solenoid L remains energized during the majority of the driving time.

Energization and de-energization of solenoid L is brought about by operation from one position to another of either of two control members N and P which are respectively actuated or controlled by vehicle speed and by driver operation of the engine accelerator pedal 275 that indirectly controls the drive train output torque. Electrical control circuit means for this purpose (see Figs. 4 and 5) includes a grounded storage battery 157 for supply of electrical energy through an ignition switch 159 to a conductor 160 thence through the branch conductor 160a and the solenoid L and branch conductor 160b to a terminal 161, whence either of two parallel conductors 162 or 163 will complete a circuit to ground at 164. A solenoid Q in parallel with the solenoid L controls an anti-stall mechanism associated with the carburetor R of the engine unit that drives the transmission unit C. The governor operated switch N is vehicle speed responsive and constitutes one of the two aforesaid control members for solenoid L. Switch N is closed at low vehicle speeds and is automatically opened at predetermined relatively higher vehicle speeds under control of the governor O. When governor operated switch N is closed, the solenoid L is energized and shift cylinder G is in its downshifted condition as shown in Fig. 4.

The other parallel circuit for energizing solenoid L, by grounding terminal 161 at 164 through conductor 163, is controlled by the driver or operator operated kickdown switch P. Kickdown switch P is closed by a full depression of the engine accelerator control pedal (note 275). The accelerator pedal thus provides a transmission torque control that constitutes the second of the two aforementioned control members for the solenoid L.

The engine ignition system J associated with this transmission is more or less conventional and includes ignition coil 176, and distributor 177. From the primary side 178 of the coil 176 an ignition interruption grounding line 179 extends through a resistance 180 to the ignition interrupter switch N and thence to ground at 164 through conductor 163 and kickdown switch P. It will thus be seen that ignition interruption can only occur when the circuit through the ignition interrupter switch N is closed.

The functioning of this transmission gear box C and its several controls is more specifically set forth in the co-pending application of Louis B. Forman, Serial No. 747,377, filed May 12, 1947.

From Figs. 5 and 6 it will be noted that the fluid withdrawn from sump 26 by pump 25 is adapted to be directed by the pressure fluid supply conduit 110 to the converter unit A, the master clutch unit B and the converter lock-up clutch D. Conduit 120 that connects the supply conduit 110 to the converter A includes a pressure regulator valve 121 to control the pressure of the fluid delivered to the converter A. Pressurized fluid passing through valve 121 to the converter A is returned to the sump 26 by the conduit 124 which has suitable fluid cooling means 125 and pressure regulator valving 126 arranged in series therewith.

Pressurized fluid from the outlet conduit 110 of the pump 25 is delivered by the conduit 130 to the control valve 131 for the master clutch unit B. Control valve 131 includes a cylinder bore 132 that has a spool-type valve 133 reciprocably mounted therein. Valve 133 has spaced lands 133a and 133c connected by a reduced neck portion 133b. Projecting from the land 133c is a rod-like valve actuator element 133d which will be further described subsequently. Also mounted in the bore 132 of valve 131 is a compression spring 134 that normally urges the valve 133 towards the right to cause valve land 133a to close the pressure fluid inlet port to valve bore 132 from conduit 130 so as to prevent the admission of pressure fluid to the clutch unit B to effect disengagement thereof. When valve 133 is moved to the right by spring 134 the pressure fluid that has been admitted to clutch B may drain out of the clutch bore 50 through conduits 135, bore 132 and drain bore 136. Spring 52 of clutch B normally urges the piston 51 towards the left to its normal clutch engaged position.

Pressurized fluid from the supply conduit 110 of pump 25 is directed by conduit 140 to the torque converter lock-up clutch control valve 141. Valve 141 includes the cylinder bore 142 in which is reciprocably mounted the spool-type valve 143. Valve 143 has spaced lands 143a and 143c connected by a reduced neck portion 143b. Extending from the valve land 143c is a portion 143d that includes a pair of spaced notches that are adapted to be engaged by a spring pressed plunger element 144 to fixedly position the valve 143 in either of two selected positions. Extending axially through the spool valve 143 is a bore 143e that receives a portion of the valve actuating rod 145. Rod 145 has spaced apart shoulder-like formations 145a and 145b that provide a lost motion connection between the rod 145 and valve 143 during axial shift of the valve 143 by rod 145. When valve 143 is positioned as shown in Fig. 6, then pressure fluid from supply conduit 140 may pass through valve bore 142 and into conduit 146 from whence it will be directed into the torque converter lock-up clutch D to effect engagement thereof. When valve 143 is shifted to the left to its other relatively fixed position, the valve land 143c will prevent pressure fluid from supply conduit 140 from passing through valve bore 142 into the clutch supply conduit 146 and then clutch D will not be engaged. When valve land 143 is in its left position the pressure fluid that has been entrapped in clutch D may drain back to sump 26 through conduit 146, valve bore 142 and drain bore 147.

To provide for the manual operation of the master clutch B this invention includes a clutch operating lever 254 that is associated with the conventional gear shift lever 72 in such a manner that the usual foot operated clutch pedal may be completely eliminated from the vehicle controls. Gear selector lever 72 is pivotally mounted on a supporting member, preferably the vehicle steering post, so that it may swing in a normal manner about a point 251 as its axis of rotation. Lever 72 operates suitable shift rail mechanism, generally indicated at 173 in Fig. 4, to effect shift of the gear selector sleeve F and the reverse idler gear 78' whereby the power transmission unit C may be conditioned for either low range or high range forward drive, reverse drive or neutral. The position of the shift lever 72 for either of these conditions is indicated respectively by the letters L, D, R and N in Fig. 7. Pivotally mounted on the outer or free end of shift lever 72 is the clutch operating lever 254. Lever 254 is mounted for limited pivotal movement about the axis of rotation indicated at 255. The inner or pivotal end of lever 254 is formed with a cam formation 256 that is adapted to engage a cooperating cam formation 257 formed on the end of the outer gear shift lever carried plunger rod 258. Rod 258 extends through a suitable bore or the like in lever 72 and has its inner end portion formed with a multiple cam formation 260. The cam portion 260a of the cam 260 is formed with one radius, while the cam portions 260b and 260c are formed with another radius. A compression type spring 261 normally urges the rod 258 towards the right.

It is thought to be obvious that when the gear shift lever 72 is positioned in its neutral position that the cam portion 260a will engage the end 133e of the valve actuator rod 133d and move valve 133 to left to the position shown in Fig. 6 and this permits pressure fluid from conduit 130 to pass through the valve 131 and enter clutch B to effect disengagement thereof. Accordingly drive cannot be transmitted through gear box C when shift lever 72 is located in neutral. It is likewise thought to be obvious that the shift lever 72 may be easily moved from neutral to either of the forward drive positions, Low or Drive, respectively, to to the Reverse drive position for the teeth of the gear box C will not be torque loaded due to the clutch B being disengaged. As the clutch control lever 254 on the outer end of shift lever 72 is grasped to shift lever 72 to one of its drive transmitting positions, the clutch lever 254 will first swing about axis 255 from its centrally located neutral position at a' to either of the positions indicated at b' or c'. In moving lever 254 to either the b' or c' position the lever cam portion 256 will engage the rod cam portion 257 and move valve 133 even farther to the left to insure that the clutch B remains disengaged during the shift of lever 72 from neutral to a drive transmitting position. Continued pressure on the lever 254 will thereafter move shift lever 72 from its centrally located neutral position to one of the drive transmitting positions. As lever 72 approaches the drive transmitting positions, which are located at the extremities of its pivotal movement, the cam portion 260a will be disengaged from the valve actuator rod end portion 133e and the cam portions 260b or 260c will engage the rod end 133e. Until shift pressure is released from the lever 254, however, the clutch B will not be engaged for the cams 256 and 257 are holding the valve 133 in the position shown in Fig. 6. Upon release of the shift pressure on lever 254, after the lever 72 has been moved to either of the drive transmitting positions at the extremities of its pivotal movement, the lever 254 will be urged by spring 261 from the clutch disengaged position at d' to the drive transmitting position at f' or from the clutch disengaged position at e' to the drive transmitting position at g'. With the cam portions 260b or 260c now engaged with the actuator rod end 133e and the cam portions 256 and 257 disengaged, the clutch control valve 133 will shift to the right and close off the pressure fluid supply from conduit 130 and permit clutch B to drain through conduit 136. Clutch B will thus engage and condition the gear box C for the transmission of the selected drive. When a change in gear ratio is to be effected then the lever 254 is grasped and moved from either position f' to position h' or from position q' to position j'. In this aforementioned pivotal movement of the lever 254 relative to the shift lever 72, the cams 256 and 257 will be re-engaged and rod 258 shifted to the left to move valve 133 to the position shown in Fig. 6 so as to disengage clutch B. Continued shift pressure on lever 254 will then move the shift lever from its extreme position to some other position with a minimum of effort for the drive train through gear box C has been broken by the disengagement of clutch B.

Operation of the torque converter lock-up clutch D is completely automatic and is dependent on the output shaft speed, and consequently vehicle speed, as well as on the torque load imposed on the output shaft 81 due to the fact that the control valve 141 for the clutch D is controlled by the differential pressure operated motor 270 that is operated in part by the torque controlling accelerator pedal 275. The speed sensitive governor mechanisms in this case may be the output shaft driven pump 84 which is arranged to deliver pressurized fluid having a pressure that is substantially proportional to the speed of the output shaft 81 during the speed range selected for operation of the clutch D. The speed sensitive pump 84 supplies pressure fluid to one end of the servomotor or valve actuating cylinder 270 by means of the conduit 271. Reciprocably mounted in the bore 272 of the servomotor cylinder 270 is a piston valve 273. Pressure fluid from conduit 271 tends to urge piston 273 to the right. Piston 273 is fixedly connected to the rod 145 that is arranged to effect actuation of the control valve 143 for the lock-up clutch D. Thus as the vehicle speed rises the pump 84 tends to shift piston 273 and valve 143 to the right to connect pressure fluid supply conduit 140 with the clutch supply conduit 146 so as to engage the clutch D and positively connect the shaft 8 to the shaft 16. To provide for torque load modification of the speed responsive controlled engagement of clutch D, the torque responsive engine accelerator control pedal 275 is connected to the piston 273 through the compressible resilient spring means 276. Spring 276 engages a shoulder 277 on rod 278 that is fixedly connected to piston 273. Thus while speed alone tends to shift piston 273 and valve 143 to the right to effect engagement of the torque converter lock-up clutch D, the point of engagement of the clutch D may be varied by the torque requirement imposed on shaft 81 due to the depression of the accelerator 275 opposing rightward shift of piston 273. In addition to the variable loading imposed on piston 273 by the accelerator pedal 275 there is another constant load applied to the piston 273 that tends to urge the piston 273 and valve 143 to the left to disengage lock-up clutch D and maintain the torque converter A in its torque multiplying capacity. This supplemental valve shifting control means that acts on piston 273 and valve 143 is the compression spring 279 that is mounted in the right end of cylinder bore 272 of valve actuating cylinder 270. By the arrangement herein disclosed it is possible to get a lock-up of the torque converter A when there is a light torque load on shaft 81, that is at substantially closed throttle, at a relatively low vehicle speed whereas when the torque load is relatively heavy and the throttle is wide open then the lock-up of the torque converter A will occur at a much higher vehicle speed and the converter A will be active over an increasingly greater speed range.

The spring 279 in combination with the spring pressed detent plunger 144 cooperate to prevent hunting of the lock-up clutch control valve 143 and this establishes definite shift points for the operation of clutch D.

In normal operation the gear shift lever 72 is moved from the neutral position to the forward, high range, drive position and released. The accelerator 275 is then depressed and the vehicle is accelerated with a torque multiplication that is the product of the torque multiplication of the converter A (2.25) times the high range gear ratio (1.5) of the gear box C times the ratio (3.3) of the rear axle X. This will give a starting ratio of approximately 11.14. As the speed increases and the torque load diminishes, the accelerator pedal is momentarily released and the shift cylinder G then automatically upshifts the gear box C into the direct drive ratio. This upshift to direct in gear box C would normally occur when the vehicle speed is between 12–25 miles per hour. Thereafter, subsequent depression of the accelerator 275 drives the vehicle through the torque converter A and the direct drive connected gear box C until predetermined conditions of output shaft speed and engine torque output, that is degree of accelerator depression, are attained which bring about shift of the converter lock-up clutch control valve 143 to the right to engage clutch D and directly connect driving shaft 8 to the transmission input shaft 49. The power transmission unit is now conditioned for the transmission of the cruising, positively connected, two-way direct drive and the slip of the torque converter has been eliminated from the drive transmission train. Accordingly, engine operating efficiency is improved, as well as coast braking characteristics, for a direct mechanical connection extends between the rear driving wheels W of the vehicle and the engine crankshaft 8.

A kickdown to third speed from the cruising direct drive is readily available for high speed acceleration. This downshift under manual control of the vehicle operator may be easily accomplished by a full depression of the accelerator pedal 275. Full depression of accelerator pedal 275 will bring about a shift of the shift sleeve E in gear box C to its third speed position due to the closing of the kickdown switch N and at the same time rod 145 that is connected to accelerator pedal 275 will move torque converter lock-up clutch control valve 143 to the left so as to disengage the lock-up clutch D and bring the torque converter back into the drive train. This is important for the converter, at relatively high vehicle speeds, then functions as a fluid coupling in absorbing shock that might otherwise be objectionable during such a downshift or change in gear ratio. The subsequent upshift to direct drive will be automatically accomplished in the usual manner.

In addition to the driver controlled downshift from direct drive to the third speed gear ratio it is thought to be obvious that there is an automatic downshift from direct drive to the third speed ratio whenever speed and torque conditions of output shaft 81 are such as to effect such a downshift. During the automatic downshift the torque converter lock-up clutch D would normally disengage first and thereafter the shift sleeve E of gear box C would bring about the downshift to third speed ratio.

It is possible that under certain conditions it might be desirable to lock-up the torque converter clutch D before the accelerator pedal 275 is released to cause the upshift of the shift sleeve E. Such a control arrangement could be accomplished by maintaining the accelerator pedal 275 depressed until the vehicle has obtained an abnormally high speed in the third speed ratio. Thereafter on release of the pedal 275 the sleeve E is shifted to effect the upshift to direct drive in the gear box C. During depression of the pedal 275 the speed of the output shaft 81 and the degree of throttle opening required by the torque load imposed on the output shaft 81 could be such as to cause rightward shift of valve 143 to effect lock-up of the converter clutch D and this could occur prior to the release of the accelerator 275 for causing the upshift of sleeve E.

The manual shift from the cruising direct drive into the low range gear ratio may be easily accomplished by merely moving shift lever 72 to the low range position. This shift is advantageous when coast braking of a very definite nature is desired or when abnormal torque is required for hard pulling.

The reverse and low positions of the shift lever 72 are shown in the same plane in Fig. 6 but from Fig. 7 it is obvious that one position is vertically spaced with respect to the other and that the shifts between these two positions will effect disengagement and reengagement of master clutch B. The conveniently adjacent positions of low and reverse are adapted to provide an easily operable means for rocking the motor vehicle between low and reverse to get out of holes, ruts or the like.

To provide pressurized oil for the operation of the converter A and clutches B and D when the engine is dead and a pushed or towed start is necessitated, the pressure fluid supply system for the conduits 120, 130 and 140 has the rear output shaft driven pump 84 tied into the pressure fluid supply system associated with the front pump 25. (See Fig. 5.) Pump 84, which draws oil from the sump 102 of the gear box C and directs it to the shift cylinder G, has a branch conduit 104 that connects to a valve unit 105 which has a pair of check valves 106 and 107 therein. Valve 106 controls the output of pump 25 and valve 107 controls the output of pump 84. When pump 25 is not operating pump 84 will supply pressure fluid to conduits 110, 120, 130 and 140 for operation of the torque converter A and the clutches B and D.

It is thought to be obvious that the power transmission unit herein disclosed is one that is substantially automatic in normal operation yet one that is under the complete control of the driver at all times so that the automatically selected cruising gear ratio may be manually overruled if a more favorable gear ratio is desired. In addition to providing increased flexibility of operation, this power transmission unit provides increased smoothness in operation due to the association of the torque converter A with the change speed gear box C. As the torque converter A provides a portion of the torque multiplication for acceleration, the drive gear ratio of box C need not be as great as has heretofore been required and accordingly smoother, faster upshifts between third and fourth forward speeds are now obtainable. This results from the fact that the gear ratio for third speed in gear box C is reduced from approximately 1.8 to 1.5 so there is a smaller speed differential between input pinion 53 and gear 62 when the shift sleeve E is to be shifted between these two relatively rotatable gear elements. Accordingly, synchronization of the speeds of these two relatively rotatable elements can be accomplished more easily and with less time delay between shifts.

Another advantage of this transmission unit is that the conventional foot operated clutch pedal has been eliminated and the operation of the master clutch B is inherent in the shift of the gear selector lever 72. Control of the vehicle is thus improved and simplified for the only pedals that now need to be operated are the brake pedal and the accelerator pedal. Thus the vehicle driver has a foot available for operation of each of these pedals at all times.

I claim:

1. A power transmission unit comprising a hydrokinetic torque converter including an impeller member, a turbine member, a reaction member, and a power operated converter lock-up clutch to drivingly connect said impeller and turbine members, a change speed gear box arranged in series with said converter member and drivingly connected to said turbine member, said gear box including input and output shafts, gearing therebetween, and a power operated shiftable member adapted to be selectively engaged with said gearing to condition said gear box for the transmission of an underdrive speed ratio and a direct drive ratio between said shafts, and control means for said power transmission unit comprising output shaft speed responsive and torque controlling means to automatically control engagement of said converter clutch, and output shaft speed responsive means and operator operable control means arranged to cooperatively and conjointly control shift of said shiftable member.

2. A power transmission unit comprising a hydrokinetic torque converter including an impeller member, a turbine member, a reaction member, and a power operated converter lock-up clutch to drivingly connect said impeller and turbine members, a change speed gear box arranged in series with said converter member and drivingly connected to said turbine member, said gear box including input and output shafts, gearing therebetween, and a power operated shiftable member adapted to be selectively engaged with said gearing to condition said gear box for the transmission of an underdrive speed ratio and a direct drive ratio between said shafts, and control means for said power transmission unit comprising output shaft speed responsive and torque controlling means to automatically control engagement of said converter clutch, and output shaft speed responsive means and operator operable control means arranged to cooperatively and conjointly control shift of said shiftable member, said operator operable control means for said shiftable member providing a control to overrule the automatic operation of said converter clutch.

3. A power transmission unit comprising a hydrokinetic torque converter including an impeller member, a turbine member, a reaction member, and a power operated converter lock-up clutch to drivingly connect said impeller and turbine members, a change speed gear box arranged in series with said converter member and drivingly connected to said turbine member, said gear box including input and output shafts, gearing therebetween, and a power operated shiftable member adapted to be selectively engaged with said gearing to condition said gear box for the transmission of an underdrive speed ratio and a direct drive ratio between said shafts, and control means for said power transmission unit comprising output shaft speed responsive and torque controlling means to automatically control engagement of said converter clutch, and output shaft speed responsive means and operator operable control means arranged to cooperatively and conjointly control shift of said shiftable member in one direction to effect the upshift from the underdrive speed ratio to the direct drive ratio and speed responsive means to automatically control shift of said shiftable member in the opposite direction to effect the downshift from the direct drive ratio to the underdrive speed ratio.

4. A power transmission unit comprising a hydrokinetic torque converter including an impeller member, a turbine member, a reaction member, and a power operated converter lock-up clutch to drivingly connect said impeller and turbine members, a change speed gear box arranged in series with said converter member and drivingly connected to said turbine member, said gear box including input and output shafts, gearing therebetween, and a power operated shiftable member adapted to be selectively engaged with said gearing to condition said gear box for the transmission of an underdrive speed ratio and a direct drive ratio between said shafts, and control means for said power transmission unit comprising output shaft speed responsive and torque controlling means to automatically control engagement of said converter clutch, and output shaft speed responsive means and operator operable control means arranged to cooperatively and conjointly control shift of said shiftable member in one direction to effect the upshift from the underdrive speed ratio to the direct drive ratio and speed responsive means to automatically control shift of said shiftable member in the opposite direction to effect the downshift from the direct drive ratio to the underdrive speed ratio, said operator operable means having means associated therewith to provide for operator overrule of said automatic controls for said torque cnverter lock-up clutch and said shiftable member whereby downshift from the direct drive ratio to the underdrive speed ratio and disengagement of said converter lock-up clutch may be accomplished at the will of the operator.

5. A power transmission unit comprising a hydrokinetic torque converter including an impeller member, a turbine member, a reaction member, and a power operated converter lock-up clutch to drivingly connect said impeller and turbine members, a change speed gear box arranged in series with said converter member and drivingly connected to said turbine member, said gear box including input and output shafts, gearing therebetween, and a power operated shiftable member adapted to be selectively engaged with said gearing to condition said gear box for the transmission of an underdrive speed ratio and a direct drive ratio between said shafts, and control means for said power transmission unit comprising output shaft speed responsive and torque controlling means to automatically and conjointly control engagement of said converter clutch, and output shaft speed responsive means and operator operable control means arranged to cooperatively and conjointly control shift of said shiftable member in one direction to effect the upshift from the underdrive speed ratio to the direct drive ratio and speed responsive means to automatically control shift of said shiftable member in the opposite direction to effect the downshift from the direct drive ratio to the underdrive speed ratio, said control means for said converter lock-up clutch being adapted to effect engagement of said clutch after said shiftable member has effected the upshift from the underdrive speed ratio to the direct drive ratio and to effect disengagement of said converter lock-up clutch before said shiftable member effects the downshift from the direct drive ratio to the underdrive speed ratio.

6. In a power transmission unit comprising a hydrokinetic torque converter having driving, driven and fluid guiding elements and a converter lock-up clutch to directly connect said driving and driven elements, a change speed gear unit arranged to be driven by said converter including input and output shafts, gearing therebetween, and a shiftable member adapted to be power shifted between a pair of positions to provide for the alternate transmission of an underdrive speed ratio and a direct drive speed ratio between said shafts, means drivingly connected between the converter driven element and the transmission input shaft, and control means for said transmission unit comprising a first source of pressure fluid, a first conduit means connecting said first source of pressure fluid to said converter lock-up clutch, a first valve associated with said first conduit means to control engagement and disengagement of said converter lock-up clutch, a second source of pressure fluid associated with said output shaft providing pressurized fluid having a pressure proportional to the speed of said output shaft, power operated means connected to said second source of pressure fluid by a second conduit means, said power operated means being adapted to be actuated by the pressurized fluid from said second source of pressure fluid to effect shift of said shiftable member, a second valve means associated with said second conduit means to control transmission of pressure fluid from said second source to the power operated means for said shiftable member, means responsive to the speed of said output shaft to control operation of said second valve, a servo motor including a movable member, means connecting said second conduit means to said servo-motor to provide for actuation of said servo-motor movable member in one direction by the pressurized fluid from said second source of pressure fluid, torque controlling means associated with said servo-motor movable member to effect actuation thereof in a direction opposite to that resulting from application of the pressurized fluid applied to said servo-motor movable member, and means connecting said servo-motor movable member to said first valve to provide for output shaft speed and torque controlled operation of said converter lock-up clutch.

7. In a power transmission unit comprising a hydrokinetic torque converter having driving, driven and fluid guiding elements and a converter lock-up clutch to directly connect said driving and driven elements, a change speed gear unit arranged to be driven by said converter including input and output shafts, gearing therebetween, and a shiftable member adapted to be power shifted between a pair of positions to provide for the alternate transmission of an underdrive speed ratio and a direct drive speed ratio between said shafts, means drivingly connected between the converter driven element and the transmission input shaft, and control means for said transmission unit comprising a first source of pressure fluid, a first conduit means connecting said first source of pressure fluid to said converter lock-up clutch, a first valve associated with said first conduit means to control engagement and disengagement of said converter lock-up clutch, a second source of pressure fluid associated with said output shaft providing pressurized fluid having a pressure proportional to the speed of said output shaft, power operated means connected to said second source of pressure fluid by a second conduit means, said power operated means being adapted to be actuated by the pressurized fluid from said second source of pressure fluid to effect shift of said shiftable member, a second valve means associated with said second conduit means to control transmission of pressure fluid from said second source to the power operated means for said shiftable member, means responsive to the speed of said output shaft to control operation of said second valve, a servo motor including a movable member, means connecting said second conduit means to said servo-motor to provide for actuation of said servo-motor movable member in one direction by the pressurized fluid from said second source of pressure fluid, torque controlling means associated with said servo-motor movable member to effect actuation thereof in a direction opposite to that resulting from application of the pressurized fluid applied to said servo-motor movable member, and means connecting said servo-motor movable member to said first valve to provide for output shaft speed and torque controlled operation of said converter lock-up clutch, said means connecting said servo-motor movable member and said first valve including a lost motion connection.

8. In a power transmission unit comprising a hydrokinetic torque converter having driving, driven and fluid guiding elements and a converter lock-up clutch to directly connect said driving and driven elements, a change speed gear unit arranged to be driven by said converter including input and output shafts, gearing therebetween, and a shiftable member adapted to be power shifted between a pair of positions to provide for the alternate transmission of an underdrive speed ratio and a direct drive speed ratio between said shafts, means drivingly connected between the converter driven element and the transmission input shaft, and control means for said transmission unit comprising a first source of pressure fluid, a first conduit means connecting said first source of pressure fluid to said converter lock-up clutch, a first valve associated with said first conduit means to control engagement and disengagement of said converter lock-up clutch, a second source of pressure fluid associated with said output shaft providing pressurized fluid having a pressure proportional to the speed of said output shaft, power operated means connected to said second source of pressure fluid by a second conduit means, said power operated means being adapted to be actuated by the pressurized fluid from said second source of pressure fluid to effect shift of said shiftable member, a second valve means associated with said second conduit means to control transmission of pressure fluid from said second source to the power operated means for said shiftable member, means responsive to the speed of said output shaft to control operation of said second valve, a servo motor including a movable member, means connecting said second conduit means to said servo-motor to provide for actuation of said servo-motor movable member in one direction by the pressurized fluid from said second source of pressure fluid, torque controlling means associated with said servo-motor movable member to effect actuation thereof in a direction opposite to that resulting from application of the pressurized fluid applied to said servo-motor movable member, and means connecting said servo-motor movable member to said first valve to provide for output shaft speed and torque controlled operation of said converter lock-up clutch, the control means for said second valve effecting shift of said shiftable member from an underdrive position to a direct drive position prior to shift of said first valve to a position to provide for engagement of said converter lock-up clutch.

9. In a power transmission unit comprising a hydrokinetic torque converter having driving, driven and fluid guiding elements and a converter lock-up clutch to directly connect said driving and driven elements, a change speed gear unit arranged to be driven by said converter including input and output shafts, gearing therebetween, and a shiftable member adapted to be power shifted between a pair of positions to provide for the alternate transmission of an underdrive speed ratio and a direct drive speed ratio between said shafts, means drivingly connected between the converter driven element and the transmission input shaft, and control means for said transmission unit comprising a first source of pressure fluid, a first conduit means connecting said first source of pressure fluid to said converter lock-up clutch, a first valve associated with said first conduit means to control engagement and disengagement of said converter lock-up clutch, a second source of pressure fluid associated with said output shaft providing pressurized fluid having a pressure proportional to the speed of said output shaft, power operated means connected to said second source of pressure fluid by a second conduit means, said power operated means being adapted to be actuated by the pressurized fluid from said second source of pressure fluid to effect shift of said shiftable member, a second valve means associated with said second conduit means to control transmission of pressure fluid from said second source to the power operated means for said shiftable member, means responsive to the speed of said output shaft to control operation of said second valve, a servo-motor including a movable member, means connecting said second conduit means to said servo-motor to provide for actuation of said servo-motor movable member in one direction by the pressurized fluid from said second source of pressure fluid, torque controlling means associated with said servo-motor movable member to effect actuation thereof in a direction opposite to that resulting from application of the pressurized fluid applied to said servo-motor movable member, and means connecting said servo-motor movable member to said first valve to provide for output shaft speed and torque controlled operation of said converter lock-up clutch, said torque controlling means associated with said servo-motor movable member including means for operator overrule of the automatic operation of said shiftable member by the speed responsive controlled second valve.

10. In an engine driven power transmission unit comprising a hydrokinetic torque converter having driving, driven and fluid guiding elements and a converter lock-up clutch to directly connect said driving and driven elements, a change speed gear unit arranged to be driven by said converter including input and output shafts, gearing therebetween, and a shiftable member adapted to be power shifted between a pair of positions to provide for the alternate transmission of an underdrive speed ratio and a direct drive speed ratio between said shafts, means drivingly connected between the converter driven element and the transmission input shaft, and control means for said transmission unit comprising a first source of pressure fluid, a first conduit means connecting said first source of pressure fluid to said converter lock-up clutch, a first valve associated with said first conduit means to control engagement and disengagement of said converter lock-up clutch, a second source of pressure fluid associated with said output shaft providing pressurized fluid having a pressure proportional to the speed of said output shaft, power operated means connected to said second source of pressure fluid by a second conduit means, said power operated means being adapted to be actuated by the pressurized fluid from said second source of pressure fluid to effect shift of said shiftable member, a second valve means associated with said second conduit means to control transmission of pressure fluid from said second source to the power operated means for said shiftable member, means responsive to the speed of said output shaft to control operation of said second valve, a servo-motor including a movable member, means connecting said second conduit means to said servo-motor to provide for actuation of said servo-motor movable member in one direction by the pressurized fluid from said second source of pressure fluid, torque controlling means associated with said servo-motor movable member to effect actuation thereof in a direction opposite to that resulting from application of the pressurized fluid applied to said servo-motor movable member means connecting the servo-motor movable member to said first valve to provide for conjoint output shaft speed and torque controlled operation of said converter lock-up clutch, the control means for said second valve effecting shift of said shiftable member from an underdrive position to a direct drive position prior to shift of said first valve to a position to provide for engagement of said converter lock-up clutch, operator operation of said torque controlling means associated with said servo-motor provide a means for overruling automatic operation of said first valve for effecting disengagement of said converter lockup- clutch.

11. In a power transmission unit comprising a hydrokinetic torque converter having driving, driven and reaction elements and a converter lock-up clutch adapted to directly connect said driving and driven elements, a change speed gear unit arranged to be driven by said converter including input and output shafts, variable speed ratio gearing between said shafts, and a shiftable member adapted to be power shifted between a pair of positions associated with said gearing to provide for the alternate transmission of an underdrive speed ratio and a direct drive speed ratio between said shafts, a master clutch mechanism connectible between said converter and the transmission input shaft, and control means for said transmission unit comprising a first source of pressure fluid associated with said converter driving element, a first conduit means connecting said first source of pressure fluid to said converter lock-up clutch, a first valve associated with said first conduit means to control engagement and disengagement of said converter lockup clutch, a second source of pressure fluid associated with said output shaft adapted to provide pressurized fluid having a pressure proportional to the speed of said output shaft, power operated means connected to said second source of pressure fluid by a second conduit means, said power operated means being adapted to be actuated by the pressurized fluid from said second source of pressure fluid to effect shift of said shiftable member, a second valve means associated with said second conduit means to control the transmission of pressurized fluid from said second source to the power operated means for said shiftable member, means responsive to the speed of said output shaft to control operation of said second valve, operator operable means associated with said gearing and said output shaft speed responsive means to control shift of said shiftable member, a servo-motor including a movable member, means connecting said second conduit means to said servo-motor to provide for actuation of said servo-motor movable member in one direction by the pressurized fluid from said second source of pressure fluid, output shaft torque controlling means associated with said servo-motor movable member to effect actuation thereof in a direction opposed to that resulting from application of the pressurized fluid applied to said movable member from said second source of pressure fluid and means connnecting said servo-motor movable member to said first valve to control operation of said converter lock-up clutch by output shaft speed responsive and torque controlling means.

12. In a power transmission unit comprising a hydrokinetic torque converter having driving, driven and reaction elements and a converter lock-up clutch adapted to directly connect said driving and driven elements, a change speed gear unit arranged to be driven by said converter including input and output shafts, variable speed ratio gearing between said shafts and a shiftable member adapted to be power shifted between a pair of positions associated with said gearing to provide for the alternate transmission of an underdrive speed ratio and a direct drive speed ratio between said shafts, a master clutch mechanism connectible between said converter and the transmission input shaft, and control means for said transmission unit comprising a first source of pressure fluid associated with said converter driving element, a first conduit means connecting said first source of pressure fluid to said converter lock-up clutch, a first valve associated with said first conduit means to control engagement and disengagement of said converter lock-up clutch, a second source of pressure fluid associated with said output shaft adapted to provide pressurized fluid having a pressure proportional to the speed of said output shaft, power operated means connected to said second source of pressure fluid by a second conduit means, said power operated means being adapted to be actuated by the pressurized fluid from said second source of pressure fluid to effect shift of said shiftable member, a second valve means associated with said second conduit means to control the transmission of pressurized fluid from said second source to the power operated means for said shiftable member, means responsive to the speed of said output shaft to control operation of said second valve, operator operable means associated with said gearing and said output shaft speed responsive means to control shift of said shiftable member, a servo-motor including a movable member, means connecting said second conduit means to said servo-motor to provide for actuation of said servo-motor movable member in one direction by the pressurized fluid from said second source of pressure fluid, output shaft torque controlling means associated with said servo-motor movable member to effect actuation thereof in a direction opposed to that resulting from application of the pressurized fluid applied to said movable member from said second source of pressure fluid, and means connecting said servo-motor movable member to said first valve to control operation of said converter lock-up clutch by output shaft speed responsive and torque controlling means, the control means for said second valve effecting shift of said shiftable member from an underdrive position to a direct drive position prior to shift of said first valve to a position to provide for engagement of said converter lock-up clutch.

13. In a power transmission unit comprising a hydrokinetic torque converter having driving, driven and reaction elements and a converter lock-up clutch adapted to directly connect said driving and driven elements, a change speed gear unit arranged to be driven by said converter including input and output shafts, variable speed ratio gearing between said shafts, and a shiftable member adapted to be power shifted between a pair of positions associated with said gearing to provide for the alternate transmission of an underdrive speed ratio and a direct drive speed ratio between said shafts, a master clutch mechanism connectible between said converter and the transmission input shaft, and control means for said transmission unit comprising a first source of pressure fluid associated with said converter driving element, a first conduit means connecting said first source of pressure fluid to said converter lock-up clutch, a first valve associated with said first conduit means to control engagement and disengagement of said converter lock-up clutch, a second source of pressure fluid associated with said output shaft adapted to provide pressurized fluid having a pressure proportional to the speed of said output shaft, power operated means connected to said second source of pressure fluid by a second conduit means, said power operated means being adapted to be actuated by the pressurized fluid from said second source of pressure fluid to effect shift of said shiftable member, a second valve means associated with said second conduit means to control the transmission of pressurized fluid from said second source to the power operated means for said shiftable member, means responsive to the speed of said output shaft to control operation of said second valve, operator operable means associated with said gearing and said output shaft speed responsive means to control shift of said shiftable member, a servo-motor including a movable member, means connecting said second conduit means to said servo-motor to provide for actuation of said servo-motor movable member in one direction by the pressurized fluid from said second source of pressure fluid, output shaft torque controlling means associated with said servo-motor movable member to effect actuation thereof in a direction opposed to that resulting from application of the pressurized fluid applied to said movable member from said second source of pressure fluid, and means connecting said servo-motor movable member to said first valve to control operation of said converter lock-up clutch by output shaft speed responsive and torque controlling means, said operator operable means associated with said gearing and said output shaft speed responsive means including means to permit operator overrule of the automatic operation of said shiftable member by the speed responsive controlled second valve.

14. In a power transmission unit comprising a hydrokinetic torque converter having driving, driven and reaction elements and a converter lock-up clutch adapted to directly connect said driving and driven elements, a change speed gear unit arranged to be driven by said converter including input and output shafts, variable speed ratio gearing between said shafts, and a shiftable member adapted to be power shifted between a pair of positions associated with said gearing to provide for the alternate transmission of an underdrive speed ratio and a direct drive speed ratio between said shafts, a master clutch mechanism connectible between said converter and the transmission input shaft, and control means for said transmission unit comprising a first source of pressure fluid associated with said converter driving element, a first conduit means connecting said first source of pressure fluid to said converter lock-up clutch, a first valve associated with said first conduit means to control engagement and disengagement of said converter lock-up clutch, a second source of pressure fluid associated with said output shaft adapted to provide pressurized fluid having a pressure proportional to the speed of said output shaft, power operated means connected to said second source of pressure fluid by a second conduit means, said power operated means being adapted to be actuated by the pressurized fluid from said second source of pressure fluid to effect shift of said shiftable member, a second valve means associated with said second conduit means to control the transmission of pressurized fluid from said second source to the power operated means for said shiftable member, means responsive to the speed of said output shaft to control operation of said second valve, operator operable means associated with said gearing and said output shaft speed responsive means to control shift of said shiftable member, a servo-motor including a movable member, means connecting said second conduit means to said servo-motor to provide for actuation of said servo-motor movable member in one direction by the pressurized fluid from said second source of pressure fluid, output shaft torque controlling means associated with said servo-motor movable member to effect actuation thereof in a direction opposed to that resulting from application of the pressurized fluid applied to said movable member from said second source of pressure fluid, and means connecting said servo-motor movable member to said first valve to control operation of said converter lock-up clutch by output shaft speed responsive and torque controlling means, said operator operable means associated with said gearing and said output shaft speed responsive means including means to permit the operator to overrule the automatic operation of said shiftable member by the speed responsive controlled second valve, operator overruling of said second valve by the torque controlling means associated with said servo-motor conjointly effecting disengagement of said converter lock-up clutch.

15. In a power transmission unit comprising a hydrokinetic torque converter having driving, driven and reaction elements and a converter lock-up clutch adapted to directly connect said driving and driven elements, a change speed gear unit arranged to be driven by said converter including input and output shafts, variable speed ratio gearing between said shafts, and a shiftable member adapted to be power shifted between a pair of positions associated with said gearing to provide for the alternate transmission of an underdrive speed ratio and a direct drive speed ratio between said shafts, a master clutch mechanism connectible between said converter and the transmission input shaft, and control means for said transmission unit comprising a first source of pressure fluid associated with said converter driving element, a first conduit means connecting said first source of pressure fluid to said converter lock-up clutch, a first valve associated with said first conduit means to control engagement and disengagement of said converter lock-up clutch, a second source of pressure fluid associated with said output shaft adapted to provide pressurized fluid having a pressure proportional to the speed of said output shaft, power operated means connected to said second source of pressure fluid by a second conduit means, said power operated means being adapted to be actuated by the pressurized fluid from said second source of pressure fluid to effect shift of said shiftable member, a second valve means associated with said second conduit means to control the transmission of pressurized fluid from said second source to the power operated means for said shiftable member, means responsive to the speed of said output shaft to control operation of said second valve, a first operator operable means associated with said gearing and said output shaft speed responsive means to control shift of said shiftable member, a servo-motor including a movable member, means connecting said second conduit means to said servo-motor to provide for actuation of said servo-motor movable member in one direction by the pressurized fluid from said second source of pressure fluid, output shaft torque controlling means associated with said servo-motor movable member to effect actuation thereof in a direction opposed to that resulting from application of the pressurized fluid applied to said movable member from said second source of pressure fluid, means connecting said servo-motor movable member to said first valve to control operation of said converter lock-up clutch by output shaft speed responsive and torque controlling means, means connected to one of said sources of pressure fluid to effect power operation of said master clutch mechanism, said last-mentioned means including a third valve to control engagement and disengagement of said clutch mechanism, and a second operator operated means to control actuation of said third valve.

16. In a power transmission unit comprising a hydrokinetic torque converter having driving, driven and reaction elements and a converter lock-up clutch adapted to directly connect said driving and driven elements, a change speed gear unit arranged to be driven by said converter including input and output shafts, variable speed ratio gearing between said shafts, and a shiftable member adapted to be power shifted between a pair of positions associated with said gearing to provide for the alternate transmission of an underdrive speed ratio and a direct drive speed ratio between said shafts, a master clutch mechanism connectible between said converter and the transmission input shaft, and control means for said transmission unit comprising a first source of pressure fluid associated with said converter driving element, a first conduit means connecting said first source of pressure fluid to said converter lock-up clutch, a first valve associated with said first conduit means to control engagement and disengagement of said converter lock-up clutch, a second source of pressure fluid associated with said output shaft adapted to provide pressurized fluid having a pressure proportional to the speed of said output shaft, power operated means connected to said second source of pressure fluid by a second conduit means, said power operated means being adapted to be actuated by the pressurized fluid from said second source of pressure fluid to effect shift of said shiftable member, a second valve means associated with said second conduit means to control the transmission of pressurized fluid from said second source to the power operated means for said shiftable member, means responsive to the speed of said output shaft to control operation of said second valve, a first operator operable means associated with said gearing and said output shaft speed responsive means to control shift of said shiftable member, a servo-motor including a movable member, means connecting said second conduit means to said servo-motor to provide for actuation of said servo-motor movable member in one direction by the pressurized fluid from said second source of pressure fluid, output shaft torque controlling means associated with said servo-motor movable member to effect actuation thereof in a direction opposed to that resulting from application of the pressurized fluid applied to said movable member from said second source of pressure fluid, means connecting said servo-motor movable member to said first valve to control operation of said converter lock-up clutch by output shaft speed responsive and torque controlling means, means connected to one of said sources of pressure fluid to effect power operation of said master clutch mechanism, said last-mentioned means including a third valve to control engagement and disengagement of said clutch mechanism, and a second operator operated means to control actuation of said third valve, said second operator operated control means for said third valve forming part of and being movable with and relative to a speed ratio selector means associated with the variable speed ratio gearing.

17. In a power transmission unit comprising a hydrokinetic torque converter having driving, driven and reaction elements and a converter lock-up clutch adapted to directly connect said driving and driven elements, a change speed gear unit arranged to be driven by said converter including input and output shafts, variable speed ratio gearing between said shafts, and a shiftable member adapted to be power shifted between a pair of positions associated with said gearing to provide for the alternate transmission of an underdrive speed ratio and a direct drive speed ratio between said shafts, a master clutch mechanism connectible between said converter and the transmission input shaft, and control means for said transmission unit comprising a first source of pressure fluid associated with said converter driving element, a first conduit means connecting said first source of pressure fluid to said converter lock-up clutch, a first valve associated with said first conduit means to control engagement and disengagement of said converter lock-up clutch, a second source of pressure fluid associated with said output shaft adapted to provide pressurized fluid having a pressure proportional to the speed of said output shaft, power operated means connected to said second source of pressure fluid by a second conduit means, said power operated means being adapted to be actuated by the pressurized fluid from said second source of pressure fluid to effect shift of said shiftable member, a second valve means associated with said second conduit means to control the transmission of pressurized fluid from said second source to the power operated means for said shiftable member, means responsive to the speed of said output shaft to control operation of said second valve, a first operator operable means associated with said gearing and said output shaft speed responsive means to control shift of said shiftable member, a servo-motor including a movable member, means connecting said second conduit means to said servo-motor to provide for actuation of said servo-motor movable member in one direction by the pressurized fluid from said second source of pressure fluid, output shaft torque controlling means associated with said servo-motor movable member to effect actuation thereof in a direction opposed to that resulting from application of the pressurized fluid applied to said movable member from said second source of pressure fluid, means connecting said servo-motor movable member to said first valve to control operation of said converter lock-up clutch by output shaft speed responsive and torque controlling means, means connected to one of said sources of pressure fluid to effect power operation of said master clutch mechanism, said last-mentioned means including a third valve to control engagement and disengagement of said clutch mechanism, and a second operator operated control means for said third valve forming part of and being movable with and relative to a speed ratio selector means associated with the variable speed ratio gearing, movement of said second operator operated control means for said third valve relative to said speed ratio selector lever effecting disengagement of said master clutch after which conjoint movement of said second operator operated control means for said third valve and said selector lever will vary the speed ratio drive.

18. In combination in a power transmission unit, a torque converter including driving and driven elements and a lock-up clutch to directly connect the converter driving and driven elements, a change speed gear box drivingly connected to said torque converter including input and output shafts, gearing therebetween, and a shiftable member adapted to be shifted between a pair of predetermined positions to provide for the transmission of an underdrive speed ratio and a direct drive speed ratio between said input and output shafts, power operated, output shaft speed responsive means to automatically control shift of said shiftable member between said two positions and power operated, output shaft speed responsive and torque controlling means to automatically control operation of the torque converter lock-up clutch.

19. In a power transmission unit comprising a hydrokinetic torque converter having driving, driven and fluid guiding elements and a converter lock-up clutch to directly connect said driving and driven elements, a change speed gear unit arranged to be driven by said converter including input and output shafts, gearing therebetween and a shiftable member adapted to be power shifted between a pair of positions to provide for the alternate transmission of an underdrive speed ratio and a direct drive speed ratio between said shafts, means drivingly connected between the converter driven element and the transmission input shaft, and control means for said transmission unit comprising a first source of pressure fluid, a first conduit means connecting said first source of pressure fluid to said converter lock-up clutch, a first valve associated with said first conduit means to control engagement and disengagement of said converter lock-up clutch, a second source of pressure fluid associated with said output shaft providing pressurized fluid having a pressure proportional to the speed of said output shaft, power operated means connected to said second source of pressure fluid by a second conduit means, said power operated means being adapted to be actuated by the pressurized fluid from said second source of pressure fluid to effect shift of said shiftable member, a second valve means associated with said second conduit means to control transmission of pressure fluid from said second source to the power operated means for said shiftable member, means responsive to the speed of said output shaft to control operation of said second valve, a servo-motor including a movable member, means connecting said second conduit means to said servo-motor to provide for actuation of said servo-motor movable member in one direction by the pressurized fluid from said second source of pressure fluid, torque controlling means associated with said servo-motor movable member to effect actuation thereof in a direction opposite to that resulting from application of the pressurized fluid applied to said servo-motor movable member, and means connecting said servo-motor movable member to said first valve to provide for output shaft speed responsive and torque controlled operation of said converter lock-up clutch, said torque controlling means associated with said servo-motor movable member including means to provide for operator overrule of the automatic operation of said shiftable member by the speed responsive controlled second valve, and operator operable means to overrule the automatic operation of said shiftable member and said converter lock-up clutch.

20. In a power transmission unit comprising a hydrokinetic torque converter having driving, driven and fluid guiding elements and a converter lock-up clutch to directly connect said driving and driven elements, a change speed gear unit arranged to be driven by said converter including input and output shafts, gearing therebetween and a shiftable member adapted to be power shifted between a pair of positions to provide for the alternate transmission of an underdrive speed ratio and a direct drive speed ratio between said shafts, means drivingly connected between the converter driven element and the transmission input shaft, and control means for said transmission unit comprising a first source of pressure fluid, a first conduit means connecting said first source of pressure fluid to said converter lock-up clutch, a first valve associated with said first conduit means to control engagement and disengagement of said converter lock-up clutch, a second source of pressure fluid associated with said output shaft providing pressurized fluid having a pressure proportional to the speed of said output shaft, power operated means connected to said second source of pressure fluid by a second conduit means, said power operated means being adapted to be actuated by the pressurized fluid from said second source of pressure fluid to effect shift of said shiftable member, a second valve means associated with said second conduit means to control transmission of pressure fluid from said second source to the power operated means for said shiftable member, means responsive to the speed of said output shaft to control operation of said second valve, a servo-motor including a movable member, means connecting said second conduit means to said servo-motor to provide for actuation of said servo-motor movable member in one direction by the pressurized fluid from said second source of pressure fluid, torque controlling means associated with said servo-motor movable member to effect actuation thereof in a direction opposite to that resulting from application of the pressurized fluid applied to said servo-motor movable member, and means connecting said servo-motor movable member to said first valve to provide for output shaft speed responsive and torque controlled operation of said converter lock-up clutch, said torque controlling means associated with said servo-motor movable member including means to provide for operator overrule of the automatic operation of said shiftable member by the speed responsive controlled second valve, and operator operable means to overrule the automatic operation of said shiftable member and said converter lock-up clutch, said operator operable means controlling the output shaft torque and conjointly controlling said converter lock-up clutch and said shiftable member to provide for disengagement of said converter lock-up clutch prior to downshift of said shiftable member from the direct drive position to the underdrive position and to provide for upshift of said shiftable member from the underdrive position to the direct drive position prior to engagement of said converter lock-up clutch.

21. In a power transmission unit comprising a hydrokinetic torque converter having driving, driven and fluid guiding elements and a converter lock-up clutch to directly connect said driving and driven elements, a change speed gear unit arranged to be driven by said converter including input and output shafts, gearing therebetween and a shiftable member adapted to be power shifted between a pair of positions to provide for the alternate transmission of an underdrive speed ratio and a direct drive speed ratio between said shafts, means drivingly connected between the converter driven element and the transmission input shaft, and control means for said transmission unit comprising a first source of pressure fluid, a first conduit means connecting said first source of pressure fluid to said converter lock-up clutch, a first valve associated with said first conduit means to control engagement and disengagement of said converter lock-up clutch, a second source of pressure fluid associated with said output shaft providing pressurized fluid having a pressure proportional to the speed of said output shaft, power operated means connected to said second source of pressure fluid by a second conduit means, said power operated means being adapted to be actuated by the pressurized fluid from said second source of pressure fluid to effect shift of said shiftable member, a second valve means associated with said second conduit means to control transmission of pressure fluid from said second source to the power operated means for said shiftable member, means responsive to the speed of said output shaft to control operation of said second valve, a servo-motor including a movable member, means connecting said second conduit means to said servo-motor to provide for actuation of said servo-motor movable member in one direction by the pressurized fluid from said second source of pressure fluid, torque controlling means associated with said servo-motor movable member to effect actuation thereof in a direction opposite to that resulting from application of the pressurized fluid applied to said servo-motor movable member, and means connecting said servo-motor movable member to said first valve to provide for output shaft speed responsive and torque controlled operation of said converter lock-up clutch, said torque controlling means associated with said servo-motor movable member including means to provide for operator overrule of the automatic operation of said shiftable member by the speed responsive controlled second valve, and operator operable means to overrule the automatic operation of said shiftable member and said converter lock-up clutch, said operator operable means being adapted to control consummation of the upshift of said shiftable member from the underdrive position to the direct drive position after said speed responsive means has conditioned the change speed gear box for the upshift to direct drive.

22. In a power transmission unit for a vehicle having an engine provided with an accelerator control, a hydrodynamic torque converter including relatively rotatable impeller, runner and guide wheels, means drivingly connecting the impeller wheel to said engine, said torque converter including clutch means to directly connect the converter impeller and runner wheels, a change speed power transmitting device including input and output shafts, variable speed gearing connected between said shafts, and a shiftable member associated with said gearing adapted to be shifted between a pair of positions to provide for the transmission of an underdrive speed ratio and a direct drive speed ratio between said shafts, means drivingly connecting said converter runner wheel to said input shaft, pressure fluid operated means to effect shift of said shiftable member, means responsive to the speed of said output shaft to automatically condition said shiftable member for an upshift from the underdrive ratio to the direct drive ratio and to automatically effect the downshift from direct drive to the underdrive speed ratio, accelerator controlled means to effect completion of the upshift to direct drive, and output shaft speed responsive and torque controlling means to automatically control engagement of said torque converter clutch means.

23. In a power transmission unit for a vehicle having an engine provided with an accelerator control, a hydrodynamic torque converter including relatively rotatable impeller, runner and guide wheels, means drivingly connecting the impeller wheel to said engine, said torque converter including clutch means to directly connect the converter impeller and runner wheels, a change speed power transmitting device including input and output shafts, variable speed gearing connected between said shafts, and a shiftable member associated with said gearing adapted to be shifted between a pair of positions to provide for the transmission of an underdrive speed ratio and a direct drive speed ratio between said shafts, means drivingly connecting said converter runner wheel to said input shaft, pressure fluid operated means to effect shift of said shiftable member, means responsive to the speed of said output shaft to automatically condition said shiftable member for an upshift from the underdrive ratio to the direct drive ratio and to automatically effect the downshift from direct drive to the underdrive speed ratio, accelerator controlled means to effect completion of the upshift to direct drive, and output shaft speed responsive and torque controlling means to automatically control engagement of said torque converter clutch means, said torque converter clutch control means being arranged to effect engagement of the converter clutch after the shiftable member has effected the upshift to direct drive and to effect disengagement of said torque converter clutch means before the control means for said shiftable member effects the downshift from direct drive to the underdrive speed ratio.

24. In a power transmission unit for a vehicle having an engine provided with an accelerator control, a hydrodynamic torque converter including relatively rotatable impeller runner and guide wheels, means drivingly connecting the impeller wheel to said engine, said torque converter including clutch means to directly connect the converter impeller and runner wheels, a change speed power transmitting device including input and output shafts, variable speed gearing connected between said shafts, and a shiftable member associated with said gearing adapted to be shifted between a pair of positions to provide for the transmission of an underdrive speed ratio and a direct drive speed ratio between said shafts, means drivingly connecting said converter runner wheel to said input shaft, pressure fluid operated means to effect shift of said shiftable member, means responsive to the speed of said output shaft to automatically condition said shiftable member for an upshift from the underdrive ratio to the direct drive ratio and to automatically effect the downshift from direct drive to the underdrive speed ratio, accelerator controlled means to effect completion of the upshift to direct drive, and output shaft speed responsive and torque controlling means to automatically control engagement of said torque converter clutch means, said torque converter clutch control means being arranged to effect engagement of the converter clutch after the shiftable member has effected the upshift to direct drive and to effect disengagement of said torque converter clutch means before the control means for said shiftable member effects the downshift from direct drive to the underdrive speed ratio, said accelerator control including operator operable means to overrule the automatic control of said shiftable member and said torque converter clutch means to provide means for effecting a downshift from direct drive to the underdrive speed ratio at the will of the vehicle operator.

References Cited in the file of this patent

UNITED STATES PATENTS

| Number | Name | Date |
|---|---|---|
| 2,074,476 | Kolb | Mar. 23, 1937 |
| 2,079,822 | Serra | May 11, 1937 |
| 2,087,643 | Gillett | July 20, 1937 |
| 2,104,061 | Surdy | Jan. 4, 1938 |
| 2,153,509 | Rockwell | Apr. 4, 1939 |
| 2,183,481 | Johnson | Dec. 12, 1939 |
| 2,332,593 | Nutt et al. | Oct. 26, 1943 |
| 2,341,921 | Jandasek | Feb. 15, 1944 |
| 2,343,304 | LaBrie | Mar. 7, 1944 |